United States Patent [19]
Naef, III

[11] Patent Number: 5,206,934
[45] Date of Patent: Apr. 27, 1993

[54] METHOD AND APPARATUS FOR INTERACTIVE COMPUTER CONFERENCING

[75] Inventor: Frederick E. Naef, III, Reston, Va.

[73] Assignee: Group Technologies, Inc., Arlington, Va.

[21] Appl. No.: 393,876

[22] Filed: Aug. 15, 1989

[51] Int. Cl.$^5$ .............................................. G06F 15/16
[52] U.S. Cl. ............................. 395/200; 364/DIG. 1; 364/228.3; 364/228.4; 364/229; 364/259.9; 364/259
[58] Field of Search ... 364/200 MS File, 900 MS File; 395/200, 375

[56] References Cited

U.S. PATENT DOCUMENTS

| | | | |
|---|---|---|---|
| 4,414,621 | 11/1983 | Bown et al. | 364/200 |
| 4,441,162 | 4/1984 | Lillie | 364/900 |
| 4,493,021 | 1/1985 | Agrawal et al. | 364/200 |
| 4,503,499 | 3/1985 | Mason et al. | 364/200 |
| 4,551,720 | 11/1985 | Levin | 340/825 |
| 4,654,483 | 3/1987 | Imai et al. | 379/54 |
| 4,686,698 | 8/1987 | Tompkins et al. | 379/53 |
| 4,718,005 | 1/1988 | Feigenbaum et al. | 364/200 |
| 4,768,150 | 8/1988 | Chang et al. | 364/300 |
| 4,777,595 | 10/1988 | Strecker et al. | 364/200 |
| 4,780,821 | 10/1988 | Crossley | 364/200 |
| 4,796,293 | 1/1989 | Blinken et al. | 379/202 |
| 4,814,984 | 3/1989 | Thompson | 364/200 |
| 4,825,354 | 4/1989 | Agrawal et al. | 364/200 |
| 4,887,204 | 12/1989 | Johnson et al. | 364/200 |
| 4,897,781 | 1/1990 | Chang et al. | 364/200 |
| 4,937,784 | 6/1990 | Masai et al. | 364/900 |
| 4,939,509 | 7/1990 | Bartholomew et al. | 340/717 |
| 4,949,248 | 8/1990 | Caro | 364/200 |
| 4,949,254 | 8/1990 | Shorter | 364/200 |
| 5,008,853 | 4/1991 | Bly et al. | 364/900 |

OTHER PUBLICATIONS

E. Circenis and R. Magnuson, "Pascal Procedures—Build a Network Painting Program", *MacTutor*, vol. 5, No. 7, pp. 28-51 (Jul. 1989).
J. Langowiski, "Forth Forum–Appletalk Protocol Handlers", *MacTutor*, vol. 5, No. 7, pp. 52-57 (Jul. 1989).
M. Stefik et al., "Beyond the Chalkboard: Computer Support for Collaboration and Problem Solving in Meetings", *Communications of the ACM*, vol. 30, No. 1, pp. 32-47 (Jan. 1987).
S. Sarin and I. Greif, "Computer-Based Real-Time Conferencing Systems", *Computer*, vol. 18, No. 10, pp. 33-45 (Oct. 1985).
H. Forsdick et al., "Initial Experience with Multimedia Documents in Diamond", *Computer Message Service, Proceedings of IFIP 6.5 Working Conference*, IFIP, pp. 97-112 (1984).
W. Pferd et al., "Interactive Graphics Teleconferencing", *Computer*, vol. 12, No. 11, pp. 62-72 (Nov. 1979).
M. Brown and R. Sedgewick, "Techniques for Algorithm Animation", *IEEE Software*, vol. 2, No. 1, pp. 28-39 (Jan. 1985).

*Primary Examiner*—Kevin A. Kriess
*Attorney, Agent, or Firm*—Venable, Baetjer & Howard

[57] ABSTRACT

A method and apparatus for conferencing among a plurality of computers is described. A local user receives inputs containing user actions and data for interpretation as to what the user action is with respect to the data and produces user action outputs. An interpreter/encoder interprets and encodes the user action outputs into packets of encoded commands and data related thereto. A communications device sends the encoded information to at least one remote user and the local user itself. An interpreter decoder at each computer interprets and decodes the encoded information specifying an operation to be performed on the data. The operation is then executed at the local user and the remote users. The system is operating system independent and multiple documents and applications may be worked on at the same time by different users.

34 Claims, 5 Drawing Sheets

METHOD AND APPARATUS FOR INTERACTIVE COMPUTER CONFERENCING

BACKGROUND OF THE INVENTION

The invention relates to computer networks and communication systems. In particular, the invention relates to a method and apparatus incorporating a computer program for implementing collaborative conferencing between two or more users.

In a traditional computer application, when a user performs an operation with an input device such as a mouse or keyboard, an event is generated by the operating system and passed to the application program for execution. The standard application would interpret the event and perform operations to change its internal data based upon what the user requested. Similar applications include, for example, performing a deletion step in a word processing program or creating a graphic element in a computer aided design (CAD) program.

When the traditional application is expanded from a single user into a multiple user environment, such as simulating a conference over a network or a modem, each user must be able to manipulate the same data and see all of the modifications made to the data. To do this, each machine must interpret and transmit information about what the user is doing and what the user is seeing. There are three basic approaches to accomplish these results. These approaches correspond to three levels of data manipulation referred to as user input, data modification and visual display. Each approach intercepts and transmits information at the particular level. As a result, each approach has specific drawbacks and benefits.

At the highest level, for example, namely the user input level, each machine intercepts its user input and transmits that input to other machines. For example, if the user clicked the mouse at a screen location (100, 150), the machine would transmit a "mouse click" command with those coordinates to other machines in the conference. The drawback of this approach is that it requires that all machines be set up in exactly the same manner including identical hardware operating systems and applications. If one user has an icon or symbol in a different place on his screen than other users, then a mouse click on that icon on one machine will not be a mouse click on the icon on the other machines. As a result, communication between the people using the system quickly breaks down because they are each seeing different things on their respective screens, thereby making this method of conferencing unusable.

At the lowest level, namely visual display, each machine intercepts visual outputs to the screen and sends it to all other users so that they see the same screen. A program which performs such a function is sometimes referred to as a remote control program. Under such schemes one machine acts as a host and contains all of the data that is manipulated. The other machines pass user inputs to the host machine and receive screen change commands back. A drawback of this method of conferencing is that it requires a large amount of information to be transmitted in the form of all or part of the screen memory and as a result it is relatively slow and inflexible. Also, because all the users in the conference share the same information, all users must possess sufficient hardware and software to display the screen information including complex graphical representations.

Both of the aforementioned methods manipulate data through one entry point. In other words, even though multiple users are working on a document, each user is seen as a single entity to the system. As a result, if one user selects text in a word processor and another user types the key, both operations will be considered as originating from one user, and the data may be accidentally destroyed. Thus, the user input and visual display systems are not truly collaborative wherein multiple users may modify the data concurrently.

In mid-level conferencing, application primitives (units of information necessary to duplicate the user's operation on remote machines) are sent from one machine to the other. While this has been done to some extent at the research level, the drawback is that some centralized control is necessary to implement the exchange of primitives. Another drawback is that high performance (speed) computers and expensive computer systems are necessary to implement such mid-level conferencing in real time. Further, with a centralized architecture, performance limitations are incurred because at least two message transmission delays result between the originating work station and the controller and then back. While the time delay may be reduced by inter-work station communications, a controller work station is required and conflicting commands must be reversed or reexecuted.

In summary then attempts have been made to produce collaborative conferencing programs or architectures but these attempts have significant drawbacks. Some of the approaches rely on host, terminal or master slave relationships among the various users. Some systems only work with the same operating system. Some attempts merely allow one user at a time to access the data. In the case of remote systems, the controller requires interpretation of screen change commands which is slow because of the high data volume. In primitive passing systems the problem is alleviated but at the cost of central processing with high performance equipment.

SUMMARY OF THE INVENTION

The present invention seeks to obviate the disadvantages and limitations of the described prior arrangements. In particular, the invention comprises a computer program and architecture for implementing conferencing among computers that can share information. The system includes means for each computer which controls communications and command routing. The system is such that any computer may communicate directly with any other connected computer. The commands from one computer are assembled as packets and are sent to itself and to other connected computers. The computer which is addressed receives the packets and converts and routes the commands to modify data and optionally to modify the user's view of the data. Any connected computer may directly affect the other computers within the system. Data is distributed among each of the computers and notification of data changes is sent to other computers by packet messaging. Each computer has its own unique entry point or cursor for data entry and/or modification, and each has a copy of the entry point of each other computer. The computer which is addressed thus determines the proper entry point for the incoming data by determining who sent the packet.

In a functional embodiment of the invention, each computer receives inputs from its local user which contains user actions and data and interprets what the user action is with respect to the data. This is manifested as user action outputs which are encoded into packets of commands and data. Encoded commands and data are sent to at least one remote user and the local user itself for decoding in order to specify the operation to be performed on the data and to execute the operation.

In an embodiment of the present invention, each computer has a conferencing program which includes an application program or module (sometimes simply referred to as application or module). An event router is responsive to local user inputs for accessing a selected application and a document such as a letter having data to be manipulated. An encoder interprets user commands for the application and assembles packets by identifying the local user, the application, the command and the document. A communications router responsive to the packet addresses the appropriate application and document. An application command router responsive to the packet interprets the packet command for manipulating the data in the selected application. The communication router is also responsive to packets from other users for routing packets on to the appropriate application for execution.

BRIEF DESCRIPTION OF THE DRAWINGS

The various objects, advantages and novel features of the present invention will be more readily understood from the following detailed description when read in conjunction with the appended drawings, in which.

Throughout the drawings, like references numerals will be understood to refer to like parts or components.

DETAILED DESCRIPTION OF THE PREFERRED EMBODIMENT

Figure 1:
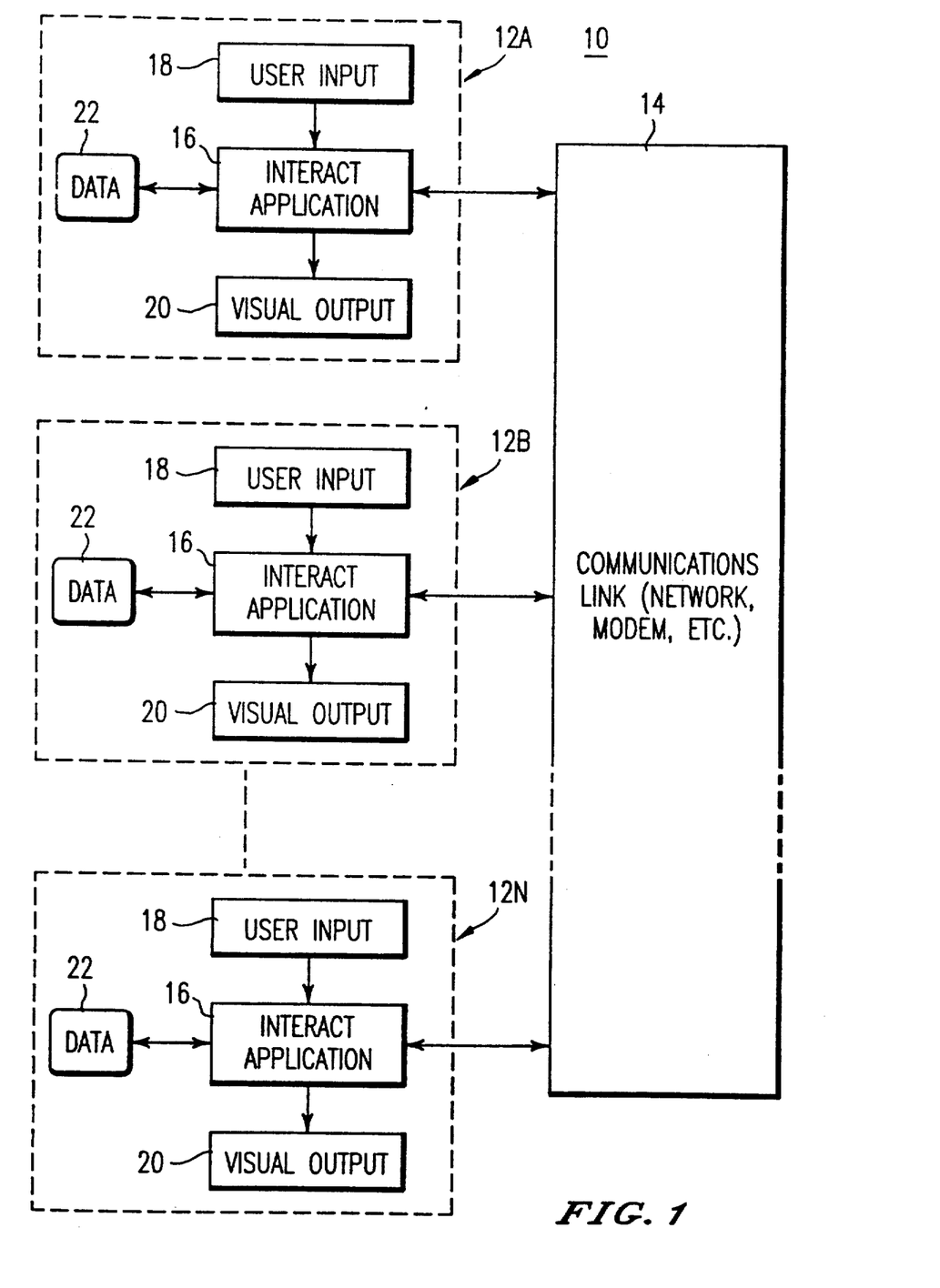
FIG. 1 is a simplified block diagram illustrating the general architecture of the conferencing system called Interact of the present invention.

FIG. 1 illustrates a general architecture of the conferencing system 10 of the present invention. In the arrangement, each of a plurality of computers 12A-12N, which may be similar or dissimilar, are coupled together over a common communications link 14 such as a network or a modem. Each computer 12A-12N, in addition to having data processing capability in a CPU and random access memory (not shown), also has an Interact application 16 for managing the conference, a user input 18, a visual output and a body of identical but separate data 22. The Interact application 16 (sometimes referred to as Interact) also may include a word processing program, a graphics program and a paint processing program (sometimes referred to as applications or modules). CAD, spread sheet and other modules may also be provided. However, in order for conferencing to occur at least one application on each machine must be compatible with an application on another machine. For example, for conferencing to occur on a word processing level each machine must have a word processing module. The same is true for graphics or paint or computer aided design and the like. Also, each computer may have its own operating system and different user inputs and visual outputs. The Interact application 16 is specifically designed to handle each operating system and a variety of user inputs. However, even though it may be stored or formatted differently in different machines, the data 22 in each of the computers is conceptually equivalent but distinct.

In accordance with the invention the user input 18 on the computer 12A to the Interact application 16 produces a desired result on the data 22 in a selected document. For example, in the word processing module incorporated into the Interact application 16 a delete key stroke commands the application 16 to effect a delete command on the data 22 in the particular document. In another computer 12B, the user may be working on another document in a graphics module incorporated into the Interact application 16. In such a case the user input 18 may be a mouse click in an icon displayed on the screen or visual output 20 of the user 12B. Each user input 18 in addition to being locally processed, that is sent to itself, is also communicated over the communication link 14 as an input to the Interact application 16 of each of the other computers. The Interact application 16 in each computer 12A-12N interprets the user input 18 and performs the data manipulation. Similarly, a user input 18 effected in computer 12B is input to the Interact application 16 for manipulating the data 22 therein and likewise user inputs are communicated over the link 14 to the other computers in the form of remote inputs to their Interact applications 16 for manipulation of the data 22. All data manipulations assure that the resulting change is the same in each machine. The effect on the data 22 is either put in storage or may be immediately displayed on the corresponding visual output 20 of each computer 12A-12N.

Figure 2:
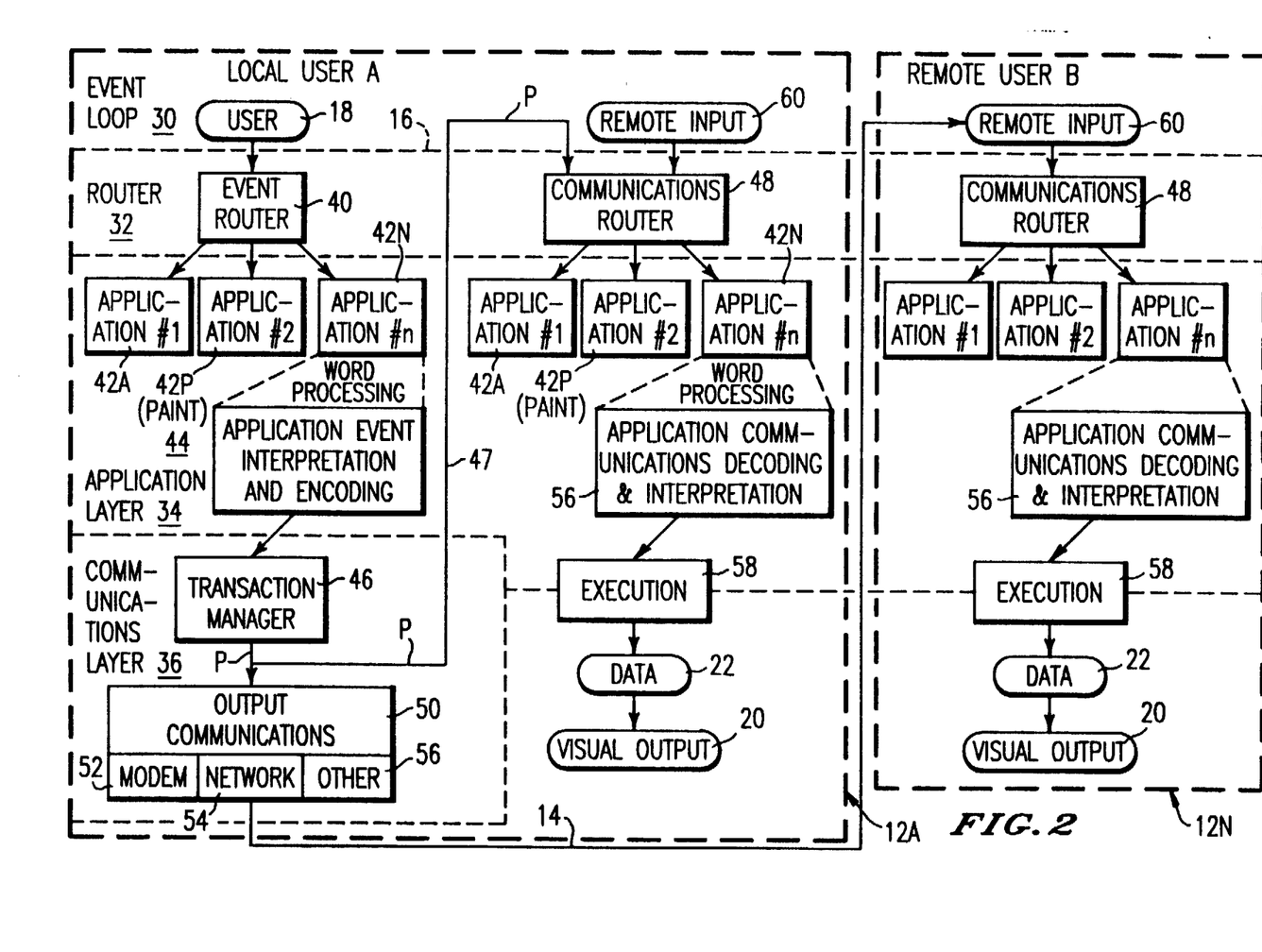
FIG. 2 is a schematic block diagram of the Interact conferencing system of the present invention employing a local and remote user in communication over a communications channel.

FIG. 2 is a more detailed illustration of the present invention in which a computer 12A, designated as the local user and a computer 12N, designated as the remote user, are shown coupled over the communication link 14. In principle as few as two users as illustrated in FIG. 2 or more may be accommodated if desired.

Each computer 12A-12N is programmed with a set of instructions, i.e. the Interact program which manifest themselves in a variety of functions hereinafter described. It should be understood that the invention is not limited to a single operating system. Thus, each computer 12A-12N may have its own unique operating system such as MS-DOS, Unix or Macintosh OS and various machines may be used on the communication link for the conference as desired. Thus, each machine 12A-12N is programmed with a copy of Interact compatible with its operating system in order to perform the various functions hereinafter described.

All users in a conference have their own copy of the data 22 that they are manipulating, and each copy must be kept exactly the same as the other copies. As a result, if one user moves text or graphics on his machine, then the text or graphics must be moved on all other machines in the conference. Also, one user may be moving text in a selected document while the other is moving graphics in another document at the same time. In each case the data in the corresponding document is changed or updated in each machine in the conference as a result of the user input. All information is passed between the machines 12A-12N concerning all the different data manipulations. When the users are working on the same document at the same location within that document, the display of changes is shown to both users, otherwise only data changes are made. As a result, multiple users can work on the same or different documents using the same or different application modules in a collaborative environment.

An illustrative example could be characterized as follows. The user A at computer 12A wishes to work on a proposal in collaboration with the user B at computer 12B. The proposal contains text and graphics documents. The present invention allows users A and B at the same time to enter changes in the text in a free for all collaboration. Similarly, they can work on graphics in the same way. They can each work independently within the conference on different parts of the text or graphics moving into and out of various application modules and documents at will. In the present invention, then, user A can put a graph in the proposal and user B can add text to the graph or work on some other part of the proposal if he wishes. The users may also enter and leave the conference if desired.

The present invention includes a number of levels of operation which have corresponding functionalities. For example, the event loop 30 is that level in which the users cause something to happen either locally or remotely. The router 32 is that level which is responsive to an event loop 30 occurrence to be appropriately routed. The application layer 34 is responsive to the selection made at the router level 32 for interpreting the event and for appropriately encoding the event as a series of information packets. At the communications level 36, the packets are fed back to the event loop level 30 of the local user 12A. In effect the local user sends the message to itself. In addition, the packet is sent over line 14 to the remote users in the conference. In each case the local user and the remote users receive coded commands and data which are routed for execution and manipulation in each corresponding machine.

In the event loop 30 at the local user 12A an event such as a key stroke or mouse click is sensed by the local user input 18. The input is then communicated to the Interact application 16. The event router 40 within the Interact application 16 interprets the event and selects an application module out of a plurality of such application modules 42A . . . 42N. The particular application selected, e.g. 42N has an interpreter/encoder 44 (shown in exploded view) which interprets the event and encodes the information. It should be understood that the other application modules 42A through 42N-1 have similar interpreter/encoders, but they are not shown in the drawing for clarity.

In the example, the word processing application module 42N is incorporated into the Interact application 16 and is designed specifically to operate with the communication system of the present invention. The application 42N selected may, for example, interpret the key stroke or mouse click for a particular function such as a delete. The application event interpreter/encoder 44 thus interprets the key stroke and produces encoded information to identify the application, the document, the command and command specific data such as the identity of the keys pressed and the data. An output of the interpreter/encoder 44 is coupled to a transaction manager 46 in the communications level 36. The transaction manager 46 responds to the encoded information and assembles it into a packet P for routing over line 47 to a communication router 48 in the local user 12A itself and to the communications block 50 in the communications level 36. The communications block may include a modem 52, a network 54 or other appropriate communication means 56 (e.g. microwave) for connecting machines whereby the communication link 14 communicates with one or more remote users 12N. In particular, the packets P are sent to the communication router 48 of each remote user 12N via its respective remote input 60.

Figure 3:
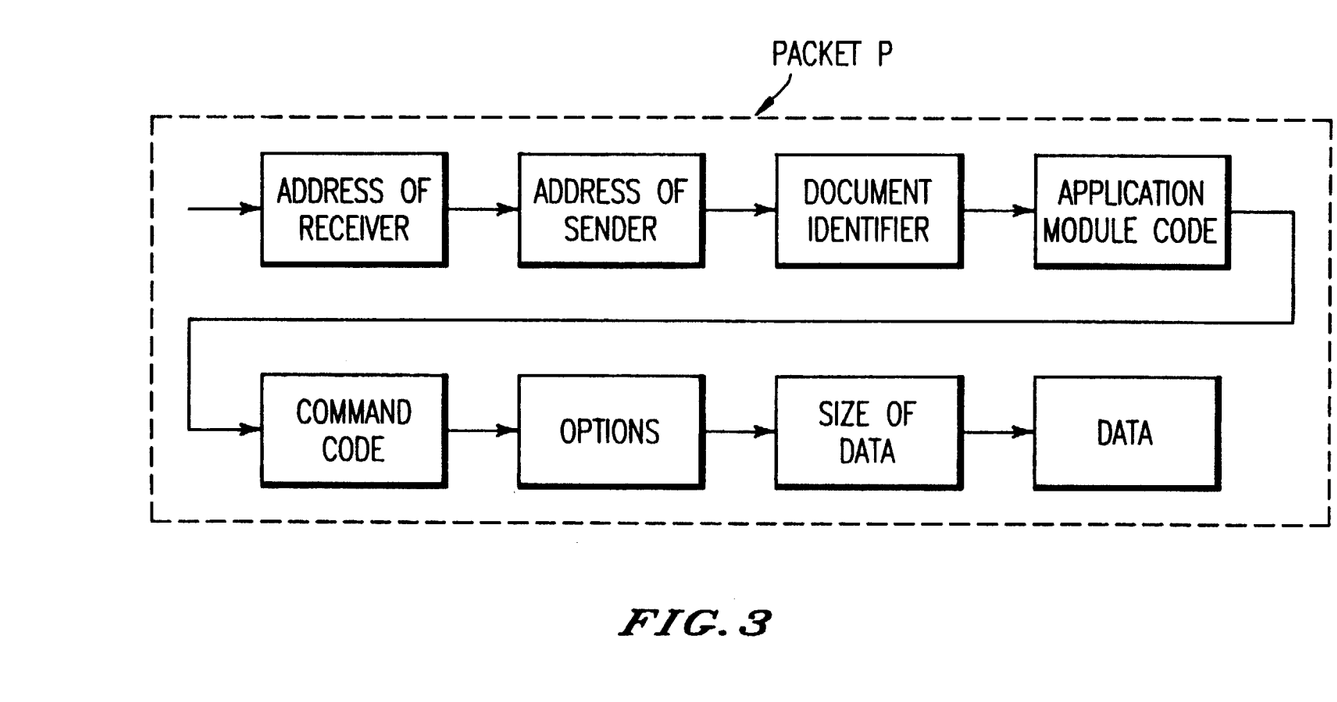
FIG. 3 is an illustration of a typical information packet which is assembled and disassembled in accordance with the teachings of the present invention.

An exemplary packet P is shown in FIG. 3. Included therein are various forms of information necessary to allow the local user 12A and the remote user 12N to execute the input event. The titles for the various forms of information are indicated in bold uppercase letters. The ADDRESS OF RECEIVER, part of the packet, directs the information to the correct remote user. Depending upon the number of users, a packet is prepared for each one. It is also within the teaching of the present invention to use a known multi-casting procedure in which a single packet is constructed with multiple remote user addresses. ADDRESS OF SENDER allows the receiver to know the source of the information so that it can determine the correct entry point, that is, where in the document the data goes. DOCUMENT IDENTIFIER locates the desired document for data entry. APPLICATION MODULE CODE identifies the application module to be used, for example, word processing. COMMAND CODE instructs the application module to perform a certain function, for example, delete. SIZE OF DATA and DATA provide command-specific data used in performing the requested operation. OPTIONS is packet space made available for other desired enhancements that may be incorporated in the future. One possibility is a check sum which would allow the receiver to insure that no packet data was lost in the transmission. These codes are received by the communication router 48 of each user 12A-12N and are utilized as hereinafter described.

The communication router 48 at the local user 12A is responsive to the packet P of information communicated by the transaction manager 46 to select or route the information to the application module 42N in accordance with the APPLICATION MODULE CODE. The application module 42N has an interpreter/decoder 56 (shown in exploded view). Once the communication router 48 selects the application 42N for execution the interpreter/decoder 56 decodes and interprets the COMMAND CODE for producing an output to the execution block 58 which manipulates the data in data block 22 and produces a visual output 20. Execution occurs in accordance with the decoded command and also in accordance with the ADDRESS OF SENDER information so that the execution occurs at the proper entry point. In this case, the sender and the receiver are one in the same, namely the local user 12A. SIZE OF DATA and DATA information is communicated so that the local user 12A can perform the operation.

The packet P of information which is implemented at the local user 12A is also communicated over the link 14 to the remote input 60 of the remote user 12N, which has a listener not shown but hereinafter discussed, which likewise includes a modem, a network or other communications device. The communication router 48 at the remote user 12N responsive to the remote input 60 performs a selection of the application 42N in the same way as the local user 12A selected its application, namely in accordance with the APPLICATION MODULE CODE. Similarly, document selection, decoding and manipulation operations are performed in the same way that they were performed at the local user except that the remote user 12N is identified by the AD- DRESS OF RECEIVER portion of the packet P and the ADDRESS OF SENDER is the local user 12A. This allows the remote user 12N to correctly determine the entry point for the data. Thus, the data at the local user 12A and the data at the remote user 12N are rendered identical.

The local user 12A may also receive a remote input 60 from other users. This remote input 60 is likewise directed to the communication router 48, as shown, for subsequent interpretation decoding and execution. Thus, all remote inputs 60 and local inputs look the same to the machine and are handled in essentially the same manner.

A more specific example follows in connection with an exemplary painting application called "PAINT". In this example, the user input is an instruction to fill a region on the screen to thereby change the data in the document and display in the painting application module in the application layer 34 (FIG. 2). The instruction is a mouse click somewhere in the painting document (i.e. at the entry point) coupled with a command to fill the space around the entry point or cursor with a certain fill pattern.

At the event loop 30, the user input 18 indicates that the user has clicked the mouse. The event loop 30 is the main dispatcher of all operations in the system. Thus, all local user actions and incoming communications from other users are passed therethrough. The information represented by the local user input 18 is directed to the event router 40 where it is interpreted and further dispatched to the appropriate application, namely application 42P entitled "PAINT." The event router 40 handles local user inputs such as mouse clicks and key strokes and passes the information on to be interpreted, encoded and transmitted to all the users including itself. The communication router 48 handles the receipt of commands to modify the data. These commands can come from either the local user 12A or from remote users 12N. Thus, there is a logical separation between command interpretation codes and data manipulation codes.

The event router 40 determines to which application 42A . . . 42N the local user input 18 is directed. In the example, when the event router 40 receives the mouse click it decides that the click occurred in a painting document and it passes that event to the painting module or (PAINT) application 42P. Using this hierarchical structure, applications can be separated from one another which thus simplifies the entire system and facilitates the addition of new applications.

The user command enters the painting module 42P of the application layer 34 where it is further interpreted, encoded, packeted and sent to the communication router 48 in a manner similar to the operations performed in the word processing module 42N described above.

The communication router 48 of the local user 12A receives and interprets the packet P which the local user 12A has produced and sent over the internal channel 47. The packet is interpreted in order to identify the application module to which the packet is addressed, for example the PAINT module 42P, and to identify what operation or command the application module 42P should perform on the data 22. In the example referred to herein, the packet application/command protocol will be (PAINT-application, fill-bucket). Also included in the packet is information about who sent the command and to what document the command is directed and other things necessary for housekeeping. Along with the protocol command, the PAINT application 42P adds data specific to that command into the packet. In the example, the packet contains information about where on the document the user clicked the mouse, and what fill pattern should be used to fill the screen.

The assembled packet is then sent to the communications layer 36 where it is transmitted to all the other users within the conference by means of the communication block 50 appropriately coupled to computers 12A-12N on the conference. The packet is sent over the channel 14 between the local user 12A and the remote users 12N by a connection hiding technique in which the various members of the conference are unaware of whether the system is using a network, a modem or other communication means. This allows various types of connections between machines to be added easily.

The transaction manager 46 assembles and sends the packet to the communication router 48 of the local user 12A and also to the communication router 48 of the remote user via the remote input 60. Thus, only one mechanism is used for interpreting and decoding packets and the associated application and command codes of the transmitted data because all packets are sent through essentially the same channels, namely the communication router 48 of each computer 12A-12N. Therefore, in the example, a fill-bucket command packet for a paint application is interpreted by the local user 12A and the remote user 12N in the same manner.

Figure 4A:
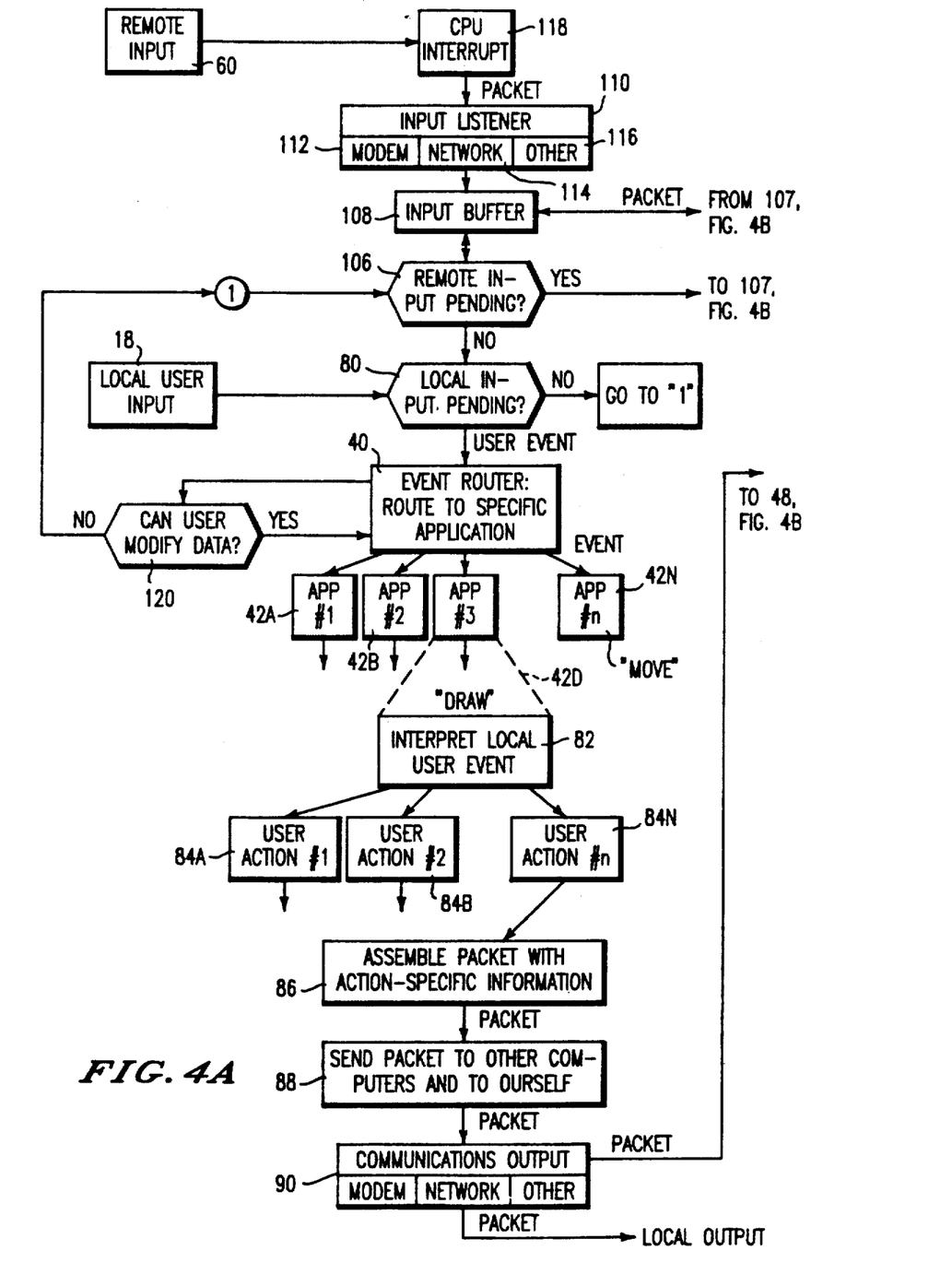
FIGS. 4A and 4B form a flow chart illustrating the operation of the Interact conferencing system illustrated in FIG. 1.
Figure 4B:
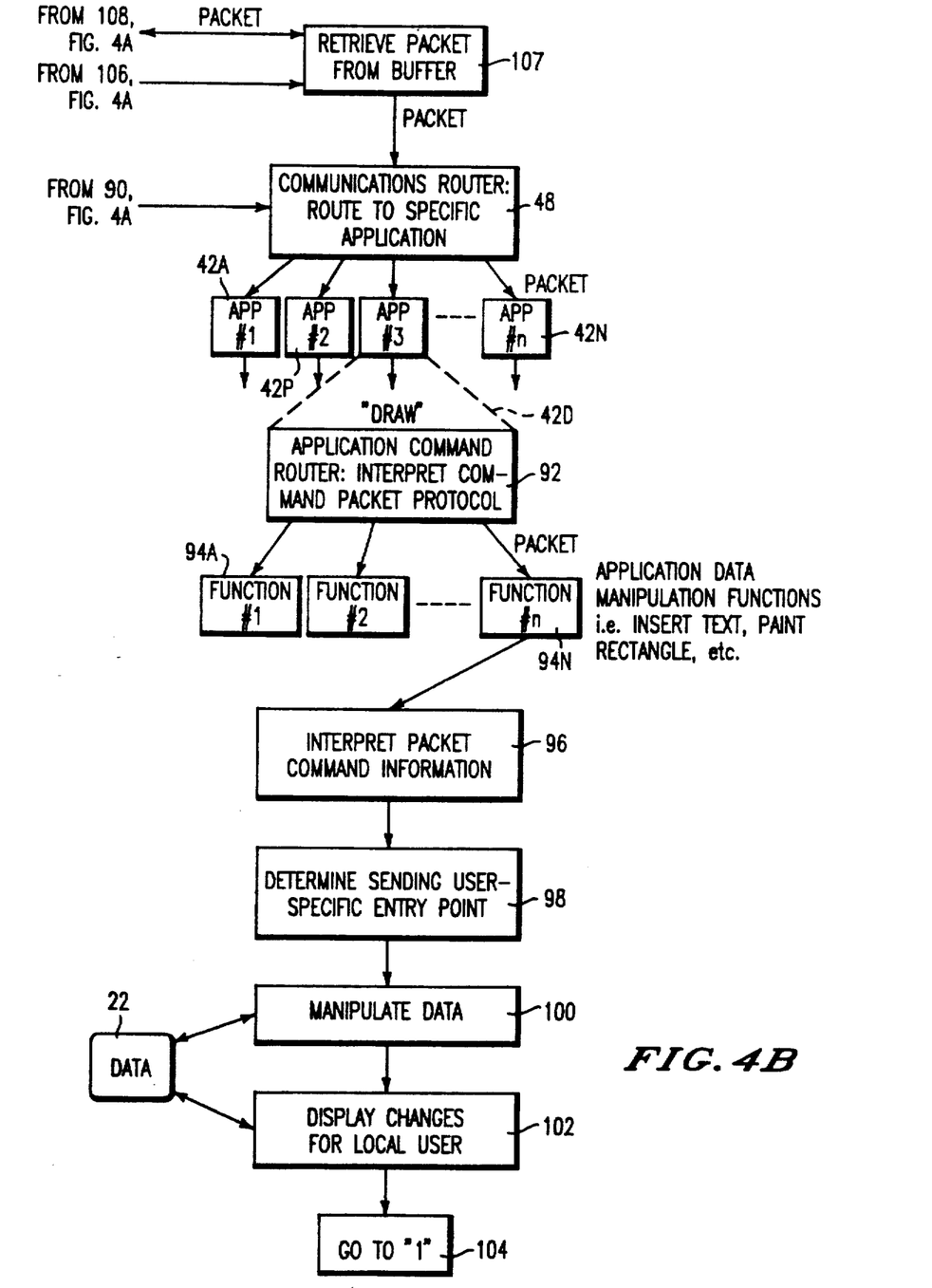

FIGS 4A and B form a flow chart which exemplifies in a more detailed manner yet another application of the present invention in which the local user 12A moves a selected object in an object oriented drawing application program or module 42D called "DRAW". This example (as are the other examples hereinbefore described) is of one function in one application There are other possible applications and functions and this description is exemplary of the general approach of the present invention.

In the example (FIGS. 4A and 4B), the local user 12A has provided local input 18 in the form of a mouse click on a selected rectangular object on a display (not shown). The program responds to the input by determining whether a local input 18 is pending in the decision "Local Input Pending?" block 80. For a user event, the program dispatches the input to the event router 40 which interprets the input to decide which application module 42A . . . 42N and to which document the user input was meant for. The routing of the input of an application 42A . . . 42N may also include mediation which is described in more detail hereinafter. In this example, the event router 40 finds that the user clicked the mouse in the "DRAW" application 42D for a specified document and thus passes the input information to the DRAW application 42D.

Each application interprets user inputs according to its own functionality. For example, a word processor and drawing program will each display things to the screen in a unique manner or interpret mouse clicks differently. Accordingly, when the "DRAW" application 42D is selected it interprets the mouse click in "Interpret Local User Event" block 82 of module 42D, (shown exploded) as the user input to request the move of all of the selected objects on the screen. Further, each application 42A-42N having been programmed to respond to user action will call its code that results in the movement of objects Thus, the program interprets the click at 82 by looking for which user action 84A . . . 84N was selected. In this case "User Action" 84N "move" is selected. Thereafter, the program performs an "Assemble Packet With Action-Specific Information" function in block 86 with encoded instructions to communicate the command "use the DRAW application to move objects from point A to point B." When the packet is assembled at 86 a "Send Packet To Other Computers And To Ourself" function is performed in block 88, and it is forwarded to other users 12N and the local user 12A by means of the communications output 50. The packet is coupled to the communication router 48 which performs a "Route To Specific Application" function which includes document selection. The packet is also sent to remote users via communications channel 14.

The communication router 48 selects the DRAW application 42D in accordance with application specific information including the document identity in the packet. The packet is coupled to the application command router 92 in the DRAW module 42D (shown exploded) which performs an "Interpret Packet Command Protocol" function in block 92 as shown. Accordingly, one of the application data manipulation function blocks 94A-94N is selected. The function "Move Objects From Point A To Point B" 94N is then selected for moving the selected object in accordance with the command code in the packet. Thereafter, the "Interpret Packet Command Information" is performed in block 96. An instruction "Determine Sending User-Specific Entry Point" is created in block 98. Thereafter, "Manipulate Data" functions are performed at block 100 and the data 22 is changed in accordance with the instructions. The "Display Changes For Local User" function is performed 102 and provides feedback to the user that the instruction has indeed been executed. Thereafter the program is returned via the GOTO "1" block 104 to the beginning of the program.

In the decision block 106 which is the encircled "1" instruction point, the "Remote Input Pending?" inquiry is made to determine whether to route the program to the "Local Input Pending?" block 80 or to a "Retrieve Packet From Buffer" block 107. The input buffer 108 receives inputs from an input listener 110 which includes a modem 112, a network 114 or some other input device 116. The input listener 110 is responsive to the CPU interrupt 118 which is coupled to the remote input 60 of the local user 12N. Thus, upon the occurrence of the remote input 60 the CPU interrupt 118 provides an input to the input listener 110 which places information in the input buffer 108. If a remote input is pending as determined by block 106, the "Retrieve Packet From Buffer" block 107 pulls the packet from the input buffer 108 and couples the packet to the communication router 48. In this case, however, the information which is interpreted and executed as described above comes from a remote user. The system, however, does not, in essence, respond any differently to remote inputs than it does to local inputs. It is possible for the local user 12A to use the DRAW program 42D while a remote user is using the PAINT program 42P and likewise it is possible for another remote user to use the WORD PROCESSING program 42N. In such a case after the local user input 18 is processed a remote user input 60 is processed in accordance with its position in the buffer 108. Thus, a remote user 12N may perform a PAINT function through the paint application 42P in a selected document and the WORD PROCESSING program 42N can perform word processing functions in yet another document. Each application 42A-42N has its own set of functional blocks in order to enable it to manipulate the data 22 but the general process is essentially the same for all applications.

Another feature of the present invention is the ability of the system to provide mediation. Normally all the computers 12A-12N operate in a free for all conference environment. Under such circumstances commands from various users are simply sent to all the other users upon the occurrence of the user input as hereinbefore described. Thus, each user receives inputs from all the other users which are stored in the input buffer and later executed.

Mediation allows one user in the conference to determine who may modify data. Approval of changes in the level of mediation are communicated to remote users via packets. If mediation is desired all local and remote user inputs are tested at the event router 40 to determine if the user initiating the input has permission to modify the data. This occurs in decision block 120 in which the input is checked against existing mediation restrictions. For example, in block 120 if "can user modify data?" is negative, the input is discarded and the program returns to the beginning of the program at "remote input pending?" 106. If affirmative, the program continues as described hereinbefore to select an application and document. If mediation is enabled, only one user is permitted to work on any document at any one time. It is possible to select some intermediate form of mediation in which users are restricted to work on any one document at any one time. Other more restrictive levels are also possible. In a preferred embodiment mediation occurs by default on a paragraph basis. However, mediation at any level can be selected and applied.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

I claim:

1. An apparatus for conferencing among at least two computers designated as local and remote user terminals, respectively, said apparatus comprising:
   means at said local user terminal for receiving and interpreting local user inputs and for producing local user action outputs;
   means at said local user terminal for encoding said local user action outputs into packets of encoded commands;
   means at said local user terminal for sending said encoded commands to at least one remote user terminal and for sending the same encoded commands to said local user terminal;
   means at said local and remote user terminals for receiving and decoding said encoded commands; and
   means at said local and remote user terminals for responding to the decoded commands by executing equivalent operations on data stored at said local and remote user terminals.

2. The apparatus of claim 1, further comprising a communications channel for coupling said local and remote user terminals.

3. The apparatus of claim 2, wherein said communications channel comprises at least one of a modem, a network, a cable or a wireless link.

4. The apparatus of claim 1, wherein said executing means is operative to render the data at said local user terminal equivalent to the data at said remote user terminal following execution and completion of said operations.

5. The apparatus of claim 1, further comprising mediation protocol means for controlling access to the data by said local and remote user terminals.

6. The apparatus of claim 1, wherein the local and remote user terminals have different operating systems.

7. A method for conferencing among at least two computers designated as local and remote user terminals, comprising the steps of:
  receiving and interpreting local user inputs at said local user terminal and producing local user action outputs in response thereto;
  encoding said local user action outputs into packets of encoded commands;
  sending said encoded commands from said local user terminal to at least one remote user terminal and to said local user terminal;
  decoding said encoded commands at said local and remote user terminals; and
  executing equivalent operations on data stored at said respective local and remote user terminals in response to said decoded commands.

8. The method of claim 7, wherein the step of sending said encoded commands to said remote user terminal is carried out using a communications channel.

9. The method of claim 7, further comprising the step of controlling access to the data by said local and remote user terminals through the use of a mediation protocol.

10. An apparatus for conferencing among at least two computers designated as local and remote user terminals, respectively, each of said local and remote user terminals having a plurality of common application modules, said apparatus comprising:
  means at said local user terminal for receiving and interpreting local user inputs and for producing local user action outputs;
  means at said local user terminal for responding to said user action outputs by modifying data stored at said local user terminal;
  means at said local user terminal for encoding said local user action outputs into application module codes and command codes;
  means at said local user terminal for sending said encoded application module codes and command codes to at least one remote user terminal;
  means at said remote user terminal for decoding each of said application module codes to select an application module for execution, and for decoding each of said command codes to specify an operation to be performed by the selected application module; and
  means at said remote user terminal for responding to the decoded application module codes and command codes by modifying data stored at said remote user terminal, said modifications corresponding to those performed by the local user terminal on the data stored at the local user terminal.

11. The apparatus of claim 10, wherein said receiving and interpreting means comprises an event router for receiving user inputs and for routing said user inputs to one of said application modules for interpretation.

12. The apparatus of claim 10, wherein said means at the remote user terminal for decoding the application module codes and command codes comprises a communications router for routing each command code to the selected application module at the remote user terminal in accordance with the corresponding application module code.

13. The apparatus of claim 10, wherein said means at the local user terminal for sending said encoded application module codes and command codes to the remote user terminal also sends said codes to the local user terminal itself, and wherein the local user terminal further comprises means for decoding each of said application module codes to select an application module for execution, and for decoding each of said command codes to specify an operation to the performed by the selected application module.

14. The apparatus of claim 13, wherein said means at the local user terminal for decoding the application module codes and command codes comprises a communications router for routing the command codes to the selected application modules in accordance with said application module codes.

15. The apparatus of claim 13, wherein said local user terminal decoding means is operative to decode application module and command codes received from the remote user terminal in substantially the same manner as codes received from the local user terminal itself.

16. A method for conferencing among at least two computers designated as local and remote user terminals, each of said local and remote user terminals having a plurality of common application modules, comprising the steps of:
  receiving and interpreting local user inputs at said local user terminal and producing local user action outputs in response thereto;
  modifying data stored at said local user terminal in response to said local user action outputs;
  encoding local said user action outputs into application module codes and command codes;
  sending said encoded application module codes and command codes from said local user terminal to at least one remote user terminal;
  decoding each of said application module codes at said remote user terminal to select an application module for execution, and decoding each of said command codes to specify an operation to be performed by the selected application module; and
  modifying data stored at the remote user terminal, said modifications corresponding to those performed by the local user terminal on the data stored at the local user terminal.

17. The method of claim 16, wherein the step of receiving and interpreting local user inputs comprises routing said inputs to one of said application modules for interpretation.

18. The method of claim 16, wherein the step of decoding the application module codes and command codes at said remote user terminal comprises routing each of said command codes to the selected application module in accordance with the corresponding application module code.

19. The method of claim 16, further comprising the steps of:

sending the encoded application module codes and command codes to the local user terminal itself; and decoding each of said application module codes at the local user terminal to select an application module for execution, and decoding each of said command codes to specify an operation to be performed by the selected application module.

20. The method of claim 19, wherein the step of decoding the application module codes and command codes comprises routing each of said command codes to the selected application module in accordance with the corresponding application module code.

21. The method of claim 19, further comprising the steps of:

receiving and interpreting remote user inputs at said remote user terminal and producing remote user action outputs in response thereto;

responding to said user action outputs by modifying data stored at said remote user terminal;

encoding said remote user action outputs into application module codes and command codes;

sending said application module codes and command codes to the local user terminal; and decoding and executing the application module codes and command codes received at the local user terminal from the remote user terminal in substantially the same manner as codes received from the local user terminal itself.

22. An apparatus for conferencing among at least two computers designated as local and remote user terminals, respectively, each of said local and remote user terminals storing a plurality of common documents, said apparatus comprising:

means at said local user terminal for receiving and interpreting local user inputs and for producing local user action outputs;

means at said local user terminal for responding to said user action outputs by executing operations on documents stored at said local user terminal;

means at said local user terminal for encoding said local user action outputs into document codes and command codes;

means at said local user terminal for sending said document codes and command codes to at least one remote user terminal;

means at said remote user terminal for decoding each of said document codes to select a document for revision, and for decoding each of said command codes to specify an operation to be performed on the selected document; and means at said remote user terminal for responding to the decoded document codes and command codes by executing operations on documents stored at said remote user terminal, said operations corresponding to the operations performed by the local user terminal on the documents stored at the local user terminal.

23. The apparatus of claim 22, wherein said means at the local user terminal for sending said encoded document codes and command codes to the remote user terminal also sends said codes to the local user terminal itself, and wherein the local user terminal further comprises means for decoding each of said document codes to select a document for revision, and for decoding each of said command codes to specify an operation to be performed on the selected document.

24. The apparatus of claim 23, wherein said local user terminal decoding means is operative to decode document codes and command codes received from the remote user terminal in substantially the same manner as codes received from the local user terminal itself.

25. A method for conferencing among at least two computers designated as local and remote user terminals, respectively, each of said local and remote user terminals storing a plurality of common documents, comprising the steps of:

receiving and interpreting local user inputs at said local user terminal and producing local user action outputs in response thereto;

executing operations on document stored at said local user terminal in response to said local user action outputs;

encoding said local user action outputs into document codes and command codes;

sending said encoded document codes and command codes from said local user terminal to at least one remote user terminal;

decoding each of said document codes at said remote user terminal to select a document for revision, and decoding each of said command codes to specify an operation to be performed on said document; and executing operations on documents stored at the remote user terminal, said operations corresponding to the operations performed by the local user terminal on the documents stored at the local user terminal.

26. The method of claim 25, further comprising the steps of:

sending the encoded document codes and command codes to the local user terminal itself; and decoding each of said document codes at the local user terminal to select a document for revision, and decoding each of said command codes to specify an operation to be performed on the selected document.

27. The method of claim 26, further comprising the steps of:

receiving and interpreting remote user inputs at said remote user terminal and producing remote user action outputs in response thereto;

responding to said remote user action outputs by executing operations on documents stored at said remote user terminal;

encoding said remote user action outputs into document codes and command codes;

sending said encoded document codes and command codes from the remote user terminal to the local user terminal; and decoding and executing the document and command codes received at the local user terminal from the remote user terminal in substantially the same manner as codes received from the local user terminal itself.

28. An apparatus for conferencing among at least two computers designated as local and remote user terminals, respectively, each of said local and remote user terminals storing a common body of data for revision or manipulation, said apparatus comprising:

means at said local user terminal for receiving and interpreting local user inputs and for producing local user action outputs;

means at said local user terminal for responding to said user action outputs by modifying the body of data stored at said local user terminal;

means at said local user terminal for encoding said local user action outputs into local user terminal identification codes and command codes;

means at said remote user terminal for decoding each of said local user terminal identification codes to identify an entry point in the body of data stored at the remote user terminal, and for decoding each of said common codes to specify a modification to be performed on said body of data at said entry point; and means at said remote user terminal for responding to the decoded local user terminal identification codes and command codes by modifying said body of data at said entry points.

29. The apparatus of claim 28, wherein said local user terminal further comprises:

means for receiving and decoding a user terminal identification code produced by the remote user terminal to identify an entry point in the body of data stored at the local user terminal, and for receiving and decoding a command code produced by the remote user terminal to specify a modification to be performed on said body of data at said entry point; and means for responding to the decoded remote user identification and command codes by modifying said body of data at said entry point.

30. A method for conferencing among at least two computers designated as local and remote user terminals, respectively, each of said local and remote user terminals storing a common body of data for revision or manipulation, said method comprising the steps of:

receiving and interpreting local user inputs at said local user terminal and producing local user action outputs in response thereto;

in response to said user action outputs, modifying the body of data stored at said local user terminal at designated entry points;

encoding said local user action outputs into local user terminal identification codes and command codes;

sending said local user terminal identification codes from said local user terminal and command codes to at least one remote user terminal;

decoding each of said local user terminal identification codes at said remote user terminal to identify an entry point in the body of data stored at the remote user terminal, and decoding each of said command codes to specify a modification to be performed on said body of data at said entry point;

responding to the decoded local user terminal identification and command codes at the remote user terminal by modifying said body of data at said entry points.

31. The method of claim 30, further comprising the steps of:

producing remote user terminal identification codes and command codes in response to user inputs at said remote user terminal;

receiving and decoding each of the remote user terminal identification codes at the local user terminal to identify an entry point in the body of data stored at the local user terminal;

receiving and decoding each of the remote user terminal command codes at the local user terminal to specify a modification to be performed on said body of data at said entry point; and responding to the decoded remote user terminal identification and command codes at the local user terminal by modifying said body of data at said entry points.

32. An apparatus for conferencing among at least two computers designated as local and remote user terminals, respectively, each of said local and remote user terminals storing a common body of data for revision or manipulation, said apparatus comprising:

means at each of said local and remote user terminals for receiving and interpreting user inputs and for producing commands in response to said inputs;

means at each of said local and remote user terminals for responding to said commands by modifying designated portions of the common body of data;

means at each of said local and remote user terminals for receiving and responding to commands produced by the other user terminal in order to continuously maintain an updated version of the data at both user terminal locations; and mediation protocol means at each of said local and remote user terminals for preventing said user terminals from modifying the same designated portion of said common body of data at the same time, the nature and size of said designated portion being selectable by the user from the group consisting of a line, a paragraph, a drawing figure, and a document.

33. A method for conferencing among at least two computers designated as local and remote user terminals, respectively, each of said local and remote user terminals storing a common body of data for revision or manipulation, said method comprising the steps of:

receiving and interpreting local and remote user inputs at said local and remote user terminals, respectively, and producing local and remote commands in response to said inputs;

responding to said local and remote commands at said local and remote user terminals, respectively, by modifying designated portions of the common body of data;

at each of said local and remote user terminals, receiving and responding to commands produced by the other user terminal in order to continuously maintain an updated version of the data at both user terminal locations;

mediating access to the data by said local and remote user terminals by preventing both user terminals from modifying the same designated portion of the common body of data at the same time; and changing the nature or size of said designated portion in response to a user input.

34. The method of claim 33, wherein the step of changing the nature or size of said designated portion in response to a user input comprises selecting said designated portion from the group consisting of a line, a paragraph, a drawing figure, and a document.

* * * * *